United States Patent [19]

Iqbal

[11] Patent Number: 4,813,455

[45] Date of Patent: Mar. 21, 1989

[54] MIXING VALVE ADJUSTABLE TEMPERATURE STOP

[75] Inventor: Muhammad Iqbal, Amherst, Ohio

[73] Assignee: Stanadyne, Inc., Windsor, Conn.

[21] Appl. No.: 665,136

[22] Filed: Oct. 26, 1984

[51] Int. Cl.$^4$ .................. F16K 11/02; F16K 51/00
[52] U.S. Cl. ........................... 137/625.17; 251/288
[58] Field of Search ............... 137/625.17, 625.41; 251/285, 288

[56] References Cited

U.S. PATENT DOCUMENTS

| | | | |
|---|---|---|---|
| 3,287,985 | 11/1966 | Moen | 74/104 |
| 3,358,714 | 12/1967 | Moen | 137/625.17 |
| 3,397,863 | 8/1968 | Bell | 251/285 |
| 3,559,684 | 2/1971 | Rudewick | 137/625.17 |
| 3,601,362 | 8/1971 | Gunther | 251/285 |
| 3,661,181 | 5/1972 | Palmer et al. | 137/625.17 |
| 3,891,005 | 6/1975 | Manoogian et al. | 137/625.4 |
| 3,964,514 | 6/1976 | Manoogian et al. | 137/625.17 |
| 3,991,427 | 11/1976 | Kemker | 4/192 |
| 4,153,077 | 5/1979 | Egli | 137/625.17 |
| 4,313,350 | 2/1982 | Keller, III et al. | 74/526 |
| 4,375,225 | 3/1983 | Andersson | 137/625.17 |
| 4,387,880 | 6/1983 | Saarisalo et al. | 251/286 |
| 4,397,330 | 8/1983 | Hayman | 137/270 |

Primary Examiner—John Rivell
Attorney, Agent, or Firm—Kinzer, Plyer, Dorn, McEachran & Jambor

[57] ABSTRACT

A mixing valve assembly includes a housing and a mixing valve positioned therein, with the mixing valve having a mixing member extending outwardly therefrom. A stop tube is positioned about the housing and there is a control element attached to the mixing member to vary the temperature of water discharged from the mixing valve. There are cooperating means on the stop tube and control element for limiting rotation of the control element and mixing member. An adjustable temperature stop sleeve extends within and is interlocked to the stop tube with the sleeve having a projection thereon which can be variably positioned for contact by the control element for limiting temperature adjustment movement thereof.

3 Claims, 4 Drawing Sheets

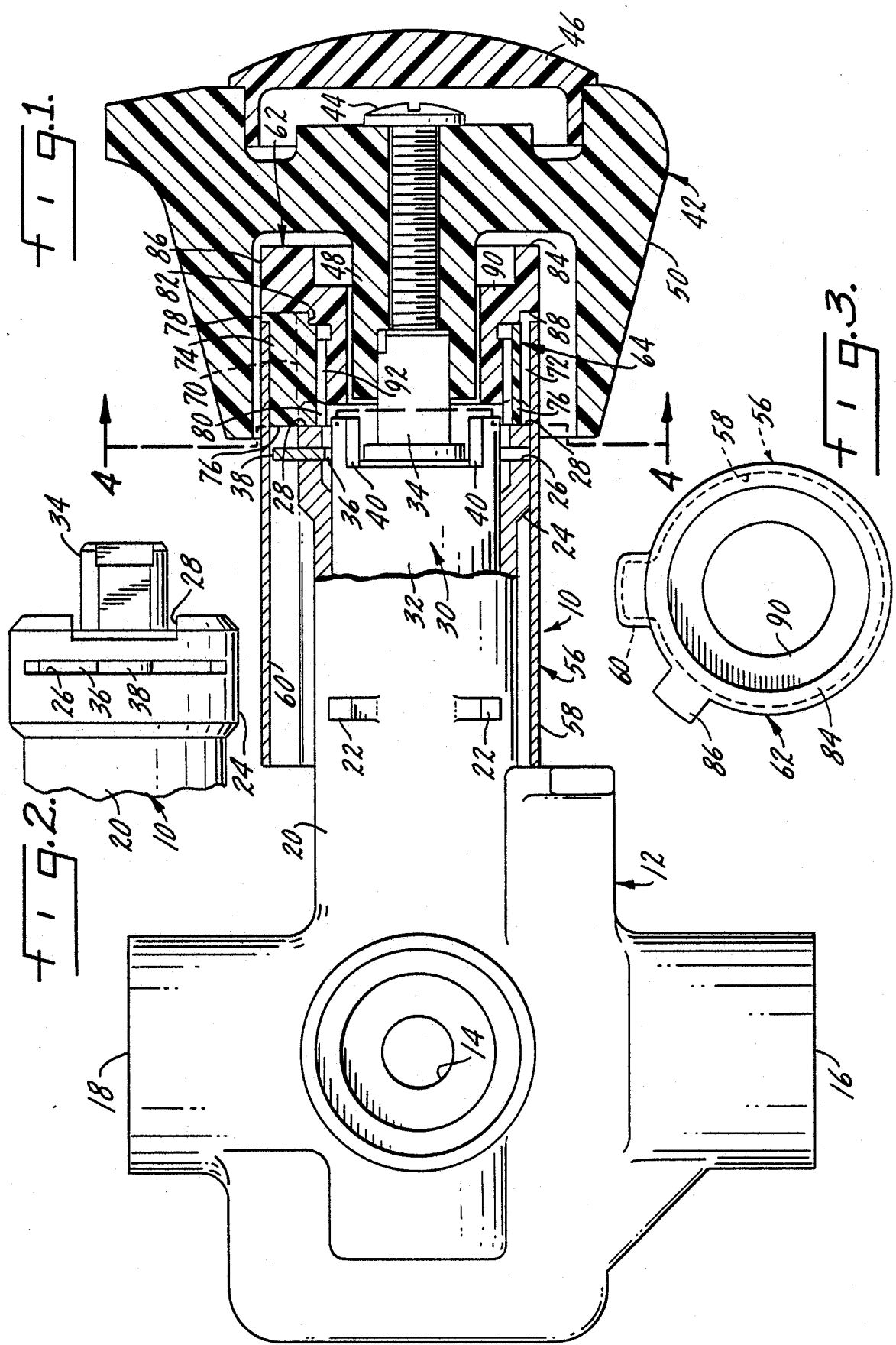

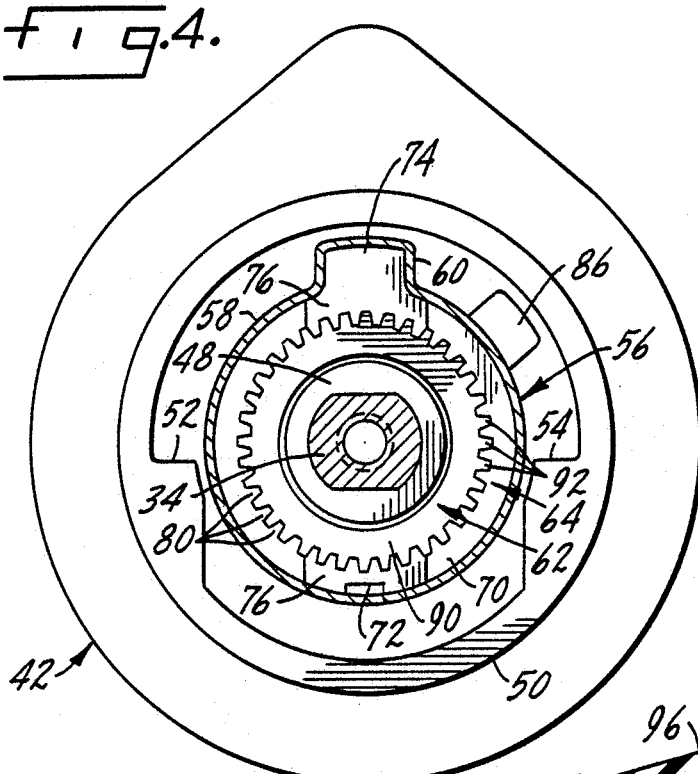
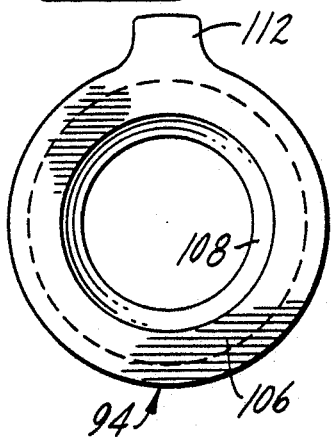
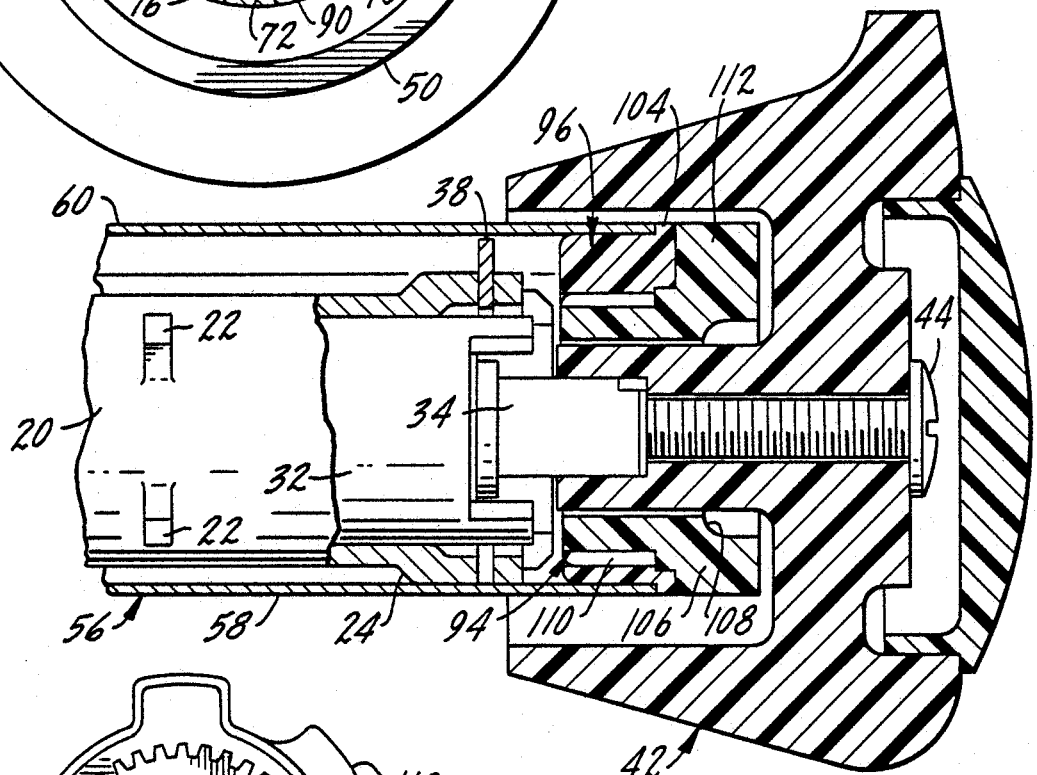
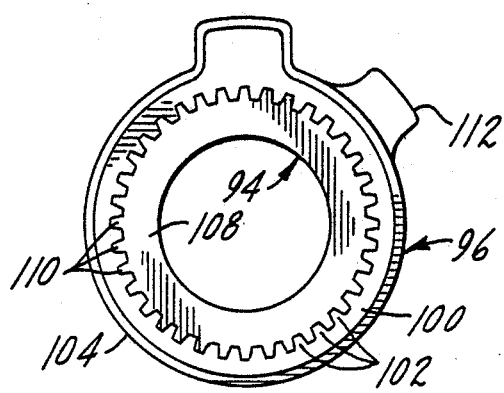

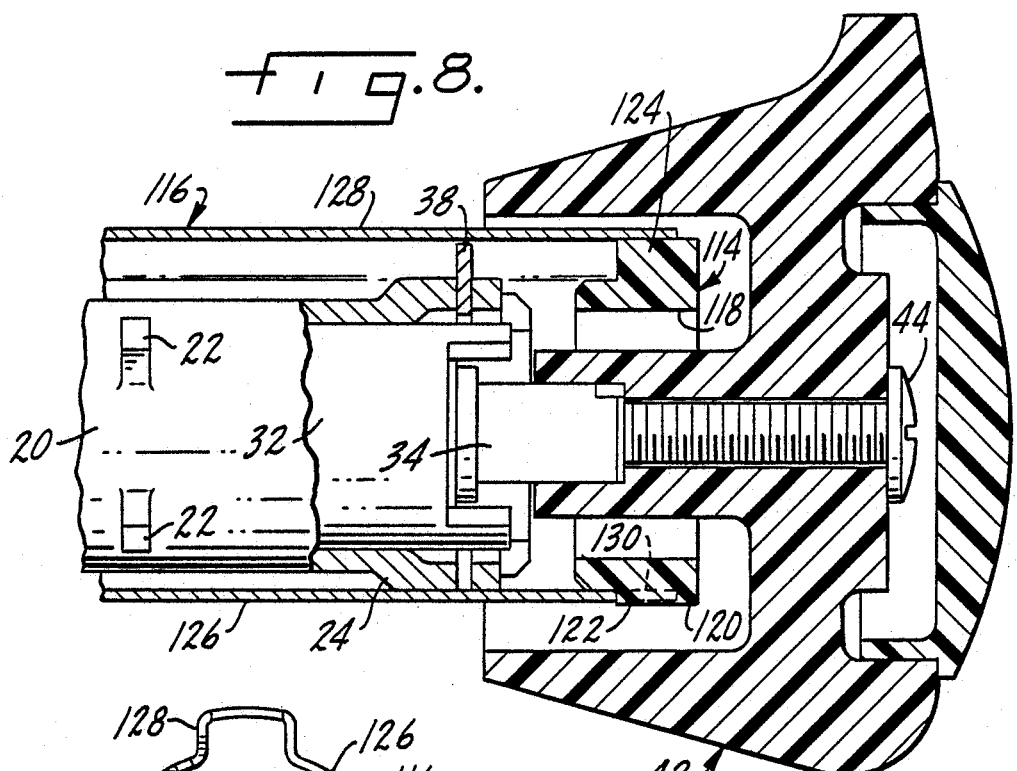
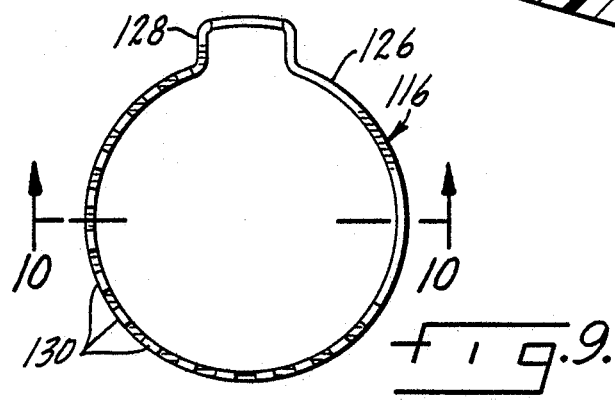
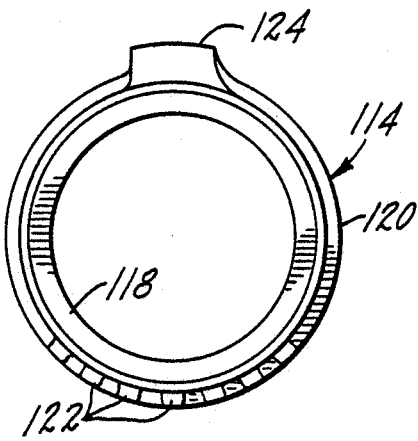
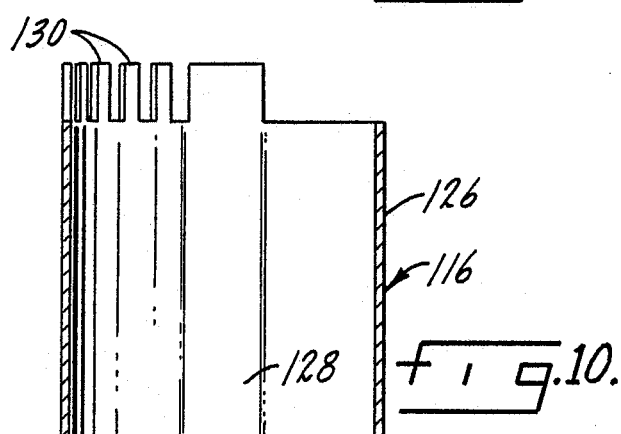

4,813,455

MIXING VALVE ADJUSTABLE TEMPERATURE STOP

SUMMARY OF THE INVENTION

The present invention relates to mixing valves, and in particular to a mixing valve assembly usable in a shower installation. The invention is specifically concerned with an adjustable temperature stop for limiting rotation of the mixing valve control member to prevent the discharge of very hot water from the mixing valve.

A primary purpose of the invention is a simply constructed, reliably operable adjustable temperature stop for a mixing valve.

Another purpose is an adjustable temperature stop of the type described which may be used with mixing valves already in the field whereby a fixed temperature stop may be refitted to become an adjustable temperature stop by the substitution of certain elements of the mixing valve assembly.

Another purpose is an adjustable temperature stop for a mixing valve in which the adjustable temperature stop is interlocked both to the stop tube of the valve assembly and to the valve housing.

Other purposes will appear in the ensuing specification, drawings and claims.

BRIEF DESCRIPTION OF THE DRAWINGS

The invention is illustrated diagrammatically in the following drawings wherein:

FIG. 1 is a side view of a mixing valve with parts in section.

FIG. 2 is a plan view of the outer end of the mixing valve housing with parts removed.

FIG. 3 is a plan view of the temperature stop used in the valve of FIG. 1.

FIG. 4 is a section taken substantially along line 4—4 of FIG. 1.

FIG. 5 is a view similar to FIG. 1, showing an alternate embodiment of the invention.

FIG. 6 is a bottom plan view of the temperature stop used in the valve FIG. 5.

FIG. 7 is a top plan view of the temperature stop used in the valve of FIG. 5.

FIG. 8 is a view similar to FIG. 1, showing a further alternate embodiment.

FIG. 9 is a top plan view of the stop tube used in FIG. 8.

FIG. 10 is a section taken substantially along line 10—10 of FIG. 9.

FIG. 11 is a bottom plan view of the temperature stop used in the valve of FIG. 8.

DETAILED DESCRIPTION OF THE INVENTION

Figure 12:
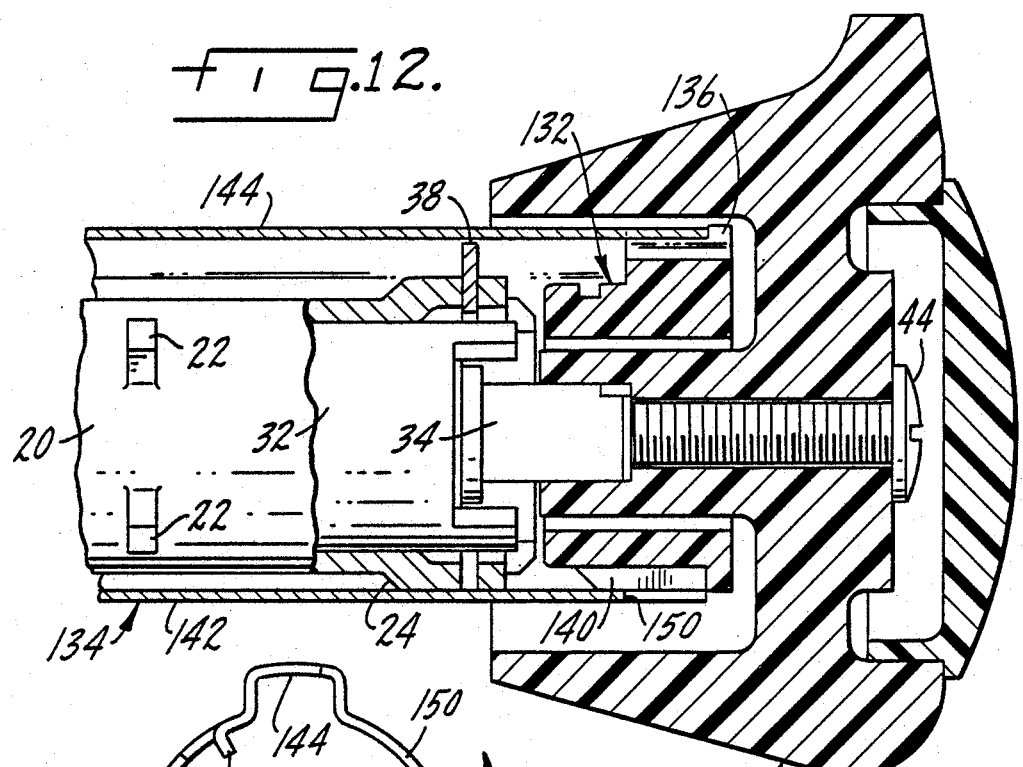
FIG. 12 is a view similar to FIG. 1, showing still a further alternate form of the invention.

FIG. 1 illustrates a mixing a valve assembly 10 usable in a shower installation. The mixing valve includes a valve body 12 having hot and cold water inlets, one of which is shown at 14. A tub discharge 16 and a shower discharge 18 extend from the body 12. The body also has a mixing valve housing 20 extending therefrom. A plurality of lugs 22 project from the surface of the housing 20. The housing is generally cylindrical and has an end portion or knob 24 of increased diameter. Looking at FIG. 2 the knob 24 has a slot 26 cut therethrough. The end surface of the knob 24 has a pair of opposed notches 28.

Returning now to FIG. 1, a mixing valve cartridge 30 fits in the housing 20. The cartridge includes a sleeve 32 and a stem 34. The sleeve is held fixed in the housing by a clip 36 which fits through the slot 26. The clip has a projecting tab 38 which extends beyond the outer diameter of the knob 24. The clip engages a pair of ears 40 which extend from the sleeve 32.

The mixing valve cartridge 30 may be of the type shown in U.S. Pat. Nos. 3,726,317 and 3,730,222. The stem 34 acts as the mixing member which, when rotated, varies the ratio of hot and cold water flowing through the valve. A control element in the form of a handle 42 is connected to the stem 34 by a screw 44. A decorative escutcheon plate 46 covers the central portion of the handle. The handle has a center post 48. The post has a bore accommodating the screw 44 and a counter bore which accepts the end of the stem 34. The handle further includes a circular skirt 50 having a pair of stops 52 and 54 (FIG. 4) formed on its interior surface.

A stop tube 56 is positioned about the valve housing 20. The stop tube has a first cylindrical portion 58 and an extension 60 of increased diameter along one side. The stop tube portion 58 fits snugly about the knob 24 of the housing and is also supported by the lugs 22. One or more indentations (not shown) may be formed in the stop tube to insure a snug press fit over the knob 24. The extension 60 accommodates the tab 38 of clip 36. The diameter of the cylindrical portion 58 is less than the inside diameter of the handle stops 52 and 54. However, the extension 60 protrudes into the path of the stops as they turn with the handle. Thus, the extension limits rotation of the handle. In a valve having both volume and temperature control, the extension serves as a minimum and a maximum temperature stop. In a valve having temperature control only, the extension serves as an off stop and a maximum temperature stop.

An adjustable temperature stop sleeve, shown generally at 62, is adjustably interlocked to the stop tube 56. The sleeve 62 includes a stop which can be variably positioned to prevent rotation of the handle all the way to the maximum temperature stop. In the embodiment of FIG. 1 the temperature stop sleeve 62 is mounted on a base gland 64 which in turn is fixed to the stop tube. The base gland is arranged to fit in the outer end of the stop tube 56. The base gland 64 has a ring 70 whose outside diameter matches the inside diameter of stop tube portion 58. A channel 72 is cut in the outer surface of the ring. Opposite the channel is an anchor 74. The anchor is shaped to fit in the extension 60 of the stop tube and lock the base gland to the stop tube. The inner end of the ring carries a pair of arcuate tabs 76. These tabs engage the notches 28 on the end of knob 24, further interlocking the base gland to the valve housing. A flange 78 engages the end of the stop tube. A plurality of splines 80 are formed on the inner surface of the ring 70. The splines end just short of the base gland's outer end, thus forming a notch 82.

The stop sleeve 62 has a rim 84 whose outside diameter matches that of both the flange 78 and the stop tube portion 58. A projection 86 extends outwardly from the rim 84. The rim is undercut at 88 to fit in the notch 82 of the base gland. An integral bushing 90 extends from the rim 84 into the base gland. A bore through the bushing accommodates the post 48 and valve stem 34. A plurality of external splines 92 are formed around the end portion of the bushing 90. These splines 92 engage the splines 80 of the base gland to interlock the stop sleeve and base gland.

The adjustability of the stop sleeve is provided by the splines in that it is possible to locate the projection 86 of the sleeve 62 in any arcuate position permitted by the engagement of the splines. In a preferred embodiment the splines are located on 10° centers so the projection 86 can be disposed at 10° intervals. If the projection is placed to coincide with the extension 60 of the stop tube, the maxiumum rotation of the valve mixing member is available. Accordingly, the valve could be positioned to discharge the maximum ratio of hot to cold water that the valve structure will allow. In installations where the hot water temperature is very high, safety considerations dictate that the hot to cold water ratio be limited to less than the maximum. This is done by limiting the rotation available to the handle and, in turn, to the mixing member of the valve cartridge. This is accomplished with the temperature stop of the present invention by removing the temperature stop sleeve 62, rotating it in the direction of the handle stop 54 and reinserting it into the base gland. This is shown in FIG. 4 where it will be noted that the projection 86 will engage the handle stop 54 short of the maximum temperature location which would otherwise be afforded by the stop tube extension 60.

FIGS. 5-7 show an alternate embodiment of the adjustable temperature stop. In this alternate form and the ones to follow the valve housing, valve cartridge and handle are all the same as in the first embodiment of FIGS. 1-4. Accordingly, these parts will be given common reference numerals and their description will not be repeated. The adjustable temperature stop sleeve is shown generally at 94. As in the previous embodiment, the stop sleeve 94 is mounted on a base gland 96. The base gland 96 is similar to the base gland 64 in that it has a ring 100 with internal splines 102 and a flange 104 at its outer end. The splines stop short of the outer end of the base gland to leave a notch for receiving the rim of the stop sleeve. The stop sleeve 94 has a rim 106 which fits down in the notch of the base gland. A bushing 108 extends from the rim 106 down into the opening of the base gland 96. Splines 110 on the outer surface of the bushing engage the splines 102 of the base gland. A projection 112 extends from the rim 106 and serves as the adjustable stop member.

Another alternate embodiment of the invention is shown in FIGS. 8-11. This form has a one-piece adjustable temperature stop 114 which mounts directly on the end of a stop tube 116. The stop 114 has a cylindrical wall 118 which terminates at its outer end at a flange 120. A plurality of splines 122 are formed on the exterior of the wall 118 and extend outwardly therefrom. A projection 124 extends outwardly from the wall and serves as the adjustable stop member.

The stop tube 116 has a generally cylindrical portion 126 and an extension 128. The extension projects beyond the outer end of the cylindrical portion 126, as best seen in FIG. 10. A series of teeth 130 extend outwardly from the outer end of the cylindrical portion 126. The spacing of the teeth is similar to that of the splines 122 so that when the temperature stop 114 is placed on the stop tube 116 the splines 122 and teeth 130 engage in interlocking fashion. The projection 124 is adjustably located in that portion above the stop tube where no teeth are formed.

Figure 13:
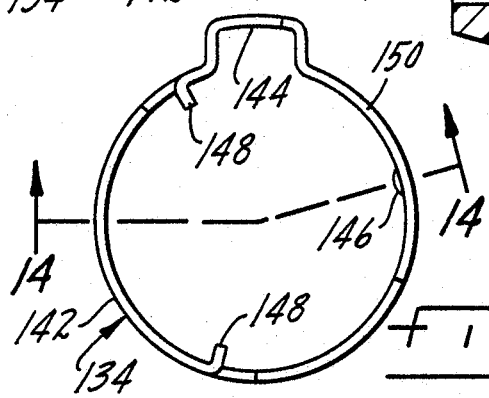
FIG. 13 is a plan view of the stop tube used in the valve of FIG. 12.
Figure 15:
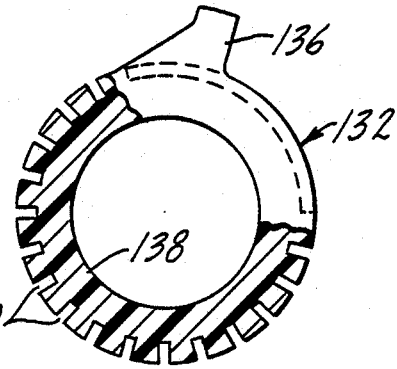
FIG. 15 is a plan view of the temperature stop used in the valve of FIG. 12, with parts in section.
Figure 14:
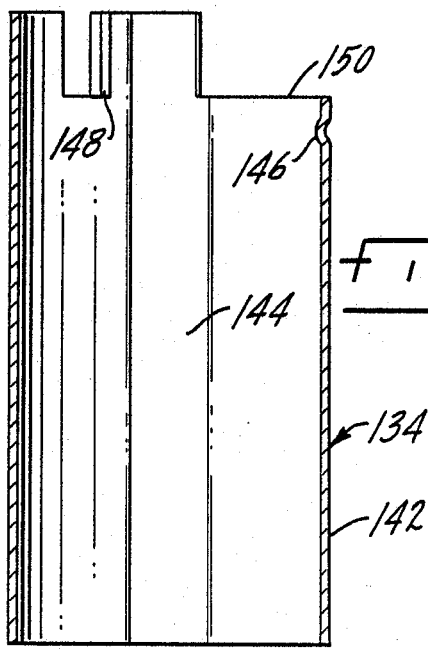
FIG. 14 is a section taken along line 14—14 of FIG. 13.
Figure 16:
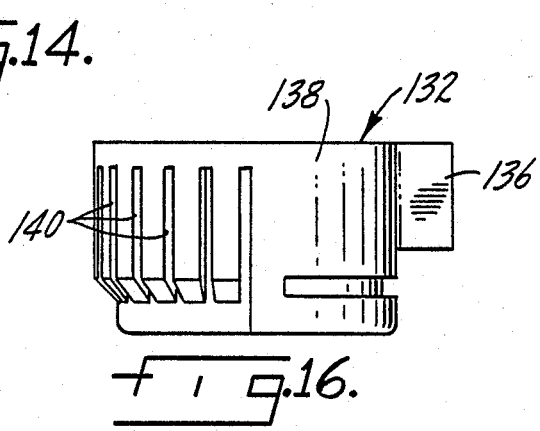
FIG. 16 is a side view of the temperature stop in FIG. 15.

Another form of the invention is shown in FIGS. 12-16. Here a one-piece adjustable stop sleeve 132 fits on the end of a stop tube 134. The stop member has a projection 136 extending from a cylindrical body 138. A plurality of slots 140 are formed in the exterior surface of the body 138. The stop tube 134 has a cylindrical portion 142 and an extension 144. The cylindrical portion includes one or more dimples 146 which assist in retaining the sleeve 132 on the stop tube 134. At the outer end of the stop tube, there are two tabs 148 folded inwardly as best seen in FIG. 13. The outer end of the cylindrical portion 142 is also cut out at 150 to accommodate the projection 136 of the temperature stop. When the stop 132 is placed on the stop tube 134, the tabs 148 engage two of the slots 140 to retain the stop 132 in the selected angular position.

Whereas a preferred form of the invention and several variations have been shown and described, it will be realized that alterations may be made thereto without departing from the scope of the following claims.

The embodiments of the invention in which an exclusive property or privilege is claimed are defined as follows:

1. An adjustable temperature stop for use with a mixing valve assembly having a housing, a mixing valve positioned therein, with the mixing valve having an outwardly extending mixing member and a control element attached thereto, said adjustable temperature stop including a stop tube formed and adapted to be positioned about the housing, a radial projection on said stop tube cooperating with the mixing valve control element for limiting rotation of the control element and mixing member, a base gland attached to and extending within said stop tube, means on siad base gland formed and adapted to interlock with the housing, said base gland having a projection extending within said stop tube radial projection, an adjustable temperature stop sleeve adjustably position relative to said base gland and having a projection thereon formed and adapted to limit rotation of the control element, said base gland and said adjustable temperature stop sleeve having mating recesses and projections thereon to provide for said variable positioning of said adjustable temperature stop sleeve.

2. An adjustable temperature stop for use with a mixing valve assembly having a housing, a mixing valve positioned therein, with the mixing valve having an outwardly extending mixing member and a control element attached thereto, said adjustable temperature stop including a stop tube formed and adapted to be positioned about the housing, cooperating means on said stop tube and the mixing valve control element for limiting rotation of the control element and mixing member, and adjustable temperature stop sleeve extending within and adjustably interlocked with said stop tube, said interlock including a plurality of projections on said stop tube extending inwardly thereof, and cooperating recesses on said adjustable temperature stop sleeve whereby said stop sleeve is variably positioned relative to said stop tube, said sleeve having a projection thereon positioned for contact by the cooperating means on the control element to limit rotation thereof.

3. An adjustable temperature stop for use with a mixing valve assembly having a housing, a mixing valve positioned therein, with the mixing valve having an outwardly extending mixing member and a control element attached thereto, said adjustable temperature stop including a stop tube formed and adapted to be positioned about the housing, cooperating means on said stop tube and the mixing valve control element for limiting rotation of the control element and mixing member, an adjustable temperature stop sleeve extending within and adjustably interloked with said stop tube, said interlock including a plurality of outwardly axially extending spaced projections on said stop tube, and a plurality of mating recesses on said adjustable temperature stop sleeve, whereby said sleeve is variably positioned upon said stop tube, said sleeve having a projection thereon positioned for contact by the cooperating means on the control element to limit rotation thereof.

* * * * *